United States Patent
Choi et al.

(10) Patent No.: US 7,864,353 B2
(45) Date of Patent: Jan. 4, 2011

(54) DOCUMENT PROCESSING SYSTEM USING IMBEDDED METADATA AND METHOD USING THE SAME

(75) Inventors: Young-min Choi, Seoul (KR); Mi-sook Song, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1224 days.

(21) Appl. No.: 11/296,205

(22) Filed: Dec. 8, 2005

(65) Prior Publication Data

US 2006/0126114 A1  Jun. 15, 2006

(30) Foreign Application Priority Data

Dec. 13, 2004  (KR) .................. 10-2004-0104819

(51) Int. Cl.
*G06F 3/12* (2006.01)
*G06K 15/00* (2006.01)
*H04N 1/00* (2006.01)

(52) U.S. Cl. .................. 358/1.15; 358/1.6; 358/1.16

(58) Field of Classification Search .............. 358/1.15, 358/1.6, 1.16
See application file for complete search history.

(56) References Cited

U.S. PATENT DOCUMENTS

| 6,704,118 B1 | 3/2004 | Hull et al. |
| 7,489,417 B2 * | 2/2009 | Tran et al. .................. 358/1.16 |
| 2001/0038462 A1 | 11/2001 | Teeuwen et al. |
| 2002/0154342 A1 * | 10/2002 | Haining ..................... 358/474 |
| 2004/0041834 A1 * | 3/2004 | Wegeng et al. ............. 345/740 |
| 2005/0086240 A1 * | 4/2005 | Richardson et al. ......... 707/100 |
| 2005/0146744 A1 * | 7/2005 | McAllister et al. ......... 358/1.15 |

FOREIGN PATENT DOCUMENTS

| JP | 6-284254 | 7/1994 |
| JP | 6-214904 | 8/1994 |
| JP | 7-264344 | 10/1995 |
| JP | 8-228273 | 9/1996 |
| JP | 2000-216934 | 8/2000 |
| JP | 2001-256097 | 9/2001 |
| KR | 2000-21824 | 4/2000 |
| KR | 2003-45985 | 6/2003 |

OTHER PUBLICATIONS

Korean Office Action dated Mar. 29, 2006 of Korean Patent Application No. 10-2004-0104819.

* cited by examiner

*Primary Examiner*—Twyler L Haskins
*Assistant Examiner*—Fred Guillermety
(74) *Attorney, Agent, or Firm*—Stanzione & Kim, LLP

(57) ABSTRACT

A document processing system and method using imbedded metadata is provided. The system includes a host computer that generates a data file that supports metadata of a document and imbeds metadata in the data file, a mobile storage device that stores the data file, and a Multi-function peripheral (MFP) device that reads the data file from the mobile storage device and extracts the metadata imbedded in the data file and processes the data file based on the extracted metadata.

18 Claims, 6 Drawing Sheets

DOCUMENT PROCESSING SYSTEM USING IMBEDDED METADATA AND METHOD USING THE SAME

CROSS-REFERENCE TO RELATED APPLICATIONS

This application claims the priority of Korean Patent Application No. 10-2004-0104819, filed on Dec. 13, 2004 in the Korean Intellectual Property Office, the entire contents of which are incorporated herein by reference.

BACKGROUND OF THE INVENTION

1. Field of the Invention

The present general inventive concept relates to a document processing and management system, and more particularly, to a document processing and management system that uses imbedded metadata and a method thereof.

2. Description of the Related Art

Multi-function peripheral (MFP) devices are multi-functional devices in which office automation devices such as a printer, a scanner, and a photocopier are combined into a single integrated device.

FIG. 1 is a flow chart illustrating a conventional method of printing or faxing a document created as a file in a host computer that is not connected to a network via a MFP device. Referring to FIG. 1, first, a sender who wants to send a fax prints the document on a print paper (S100), inserts the printed document into the MFP device (S110), and inputs the fax number (S120). Then the MFP device scans the printed document and creates fax data (S130), transmits the fax data to a MFP device at the receiving side through, for example, a network (S140), and the MFP device at the receiving side prints the received fax data onto a print paper (S150).

In this case, there is an inconvenience of having to print the document created as a file in the host computer on the print paper, and then transmitting the fax data of the printed document. In addition, document management regarding when and where a certain document was transmitted is difficult. For example, when numerous documents need to be transmitted to different fax numbers, it is burdensome to type each of the fax numbers into the MFP device.

SUMMARY OF THE INVENTION

The present general inventive concept provides a document processing system and method which inputs metadata into a data file in a host computer and processes the data file using the metadata in a multi-function peripheral (MFP) device.

Additional aspects and advantages of the present general inventive concept will be set forth in part in the description which follows and, in part, will be obvious from the description, or may be learned by practice of the general inventive concept.

The foregoing and/or other aspects of the present general inventive concept are achieved by providing a method of document processing using a MFP device including generating a data file that supports metadata of a document and imbedding a predetermined metadata in the data file, storing the data file in a mobile storage device, reading the data file from the mobile storage device and extracting the metadata imbedded in the data file at the MFP device, and processing the data file based on the extracted metadata.

The method may further include inputting information including a time the data file is processed or a number of pages of the document in the metadata.

The metadata may include at least a fax number of a recipient.

The processing of the data file may include transmitting the data file through a network to the corresponding fax number of the recipient.

The method may further include inputting information including a time the data file is transmitted or a number of pages of the data file transmitted of the corresponding document in the metadata.

The metadata may further include at least information on a printing setting of the document.

The processing of the data file may include printing the data file according to the information on the printing setting of the document.

The printing of the data file may include converting a format of the extracted metadata into a page description language (PDL) format, changing the data file into a PDL file, imbedding the converted metadata in the PDL file, and printing the PDL file based on the imbedded metadata.

The method may further include inputting information including a time the data file is printed or a number of pages of the document as printed in the metadata.

The method may further include, inputting information including a time the data file is printed or a number of pages of the document as printed in the metadata.

The foregoing and/or other aspects of the present general inventive concept may also be achieved by providing a document processing system which processes a document using a MFP device including a host computer which generates a data file that supports metadata of the document and imbeds the metadata in the file, a mobile storage device which stores the data file, and a MFP device which reads the data file from the mobile storage device, extracts the metadata imbedded in the data file, and processes the data file based on the extracted metadata.

The host computer may include a data file generating unit which generates the data file that supports the metadata of the document, and a metadata imbedding unit which imbeds the metadata in the data file.

The MFP device may include a data file reading unit which reads the data file from the mobile storage device, a metadata extracting unit which extracts the metadata imbedded in the data file, and a metadata processing unit which processes the data file based on the extracted metadata.

The metadata imbedding unit may imbed metadata including at least a fax number of a recipient in the data file.

The metadata processing unit may transmit the data file to the recipient of the fax number through a network.

The system further includes a data file managing unit which inputs information on a time the data file is transmitted or a number of pages of the document in the metadata.

The metadata imbedding unit may imbed the metadata including at least information on a printing setting of the document in the data file.

The metadata processing unit may convert a format of the extracted metadata into a PDL file format, change the data file into a PDL file, imbed the converted metadata in the PDL file, and print the PDL file based on the information on a printing setting of the document.

The system may further include a data file managing unit which inputs information on a time the data file is printed or a number of pages of the document as printed in the metadata.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
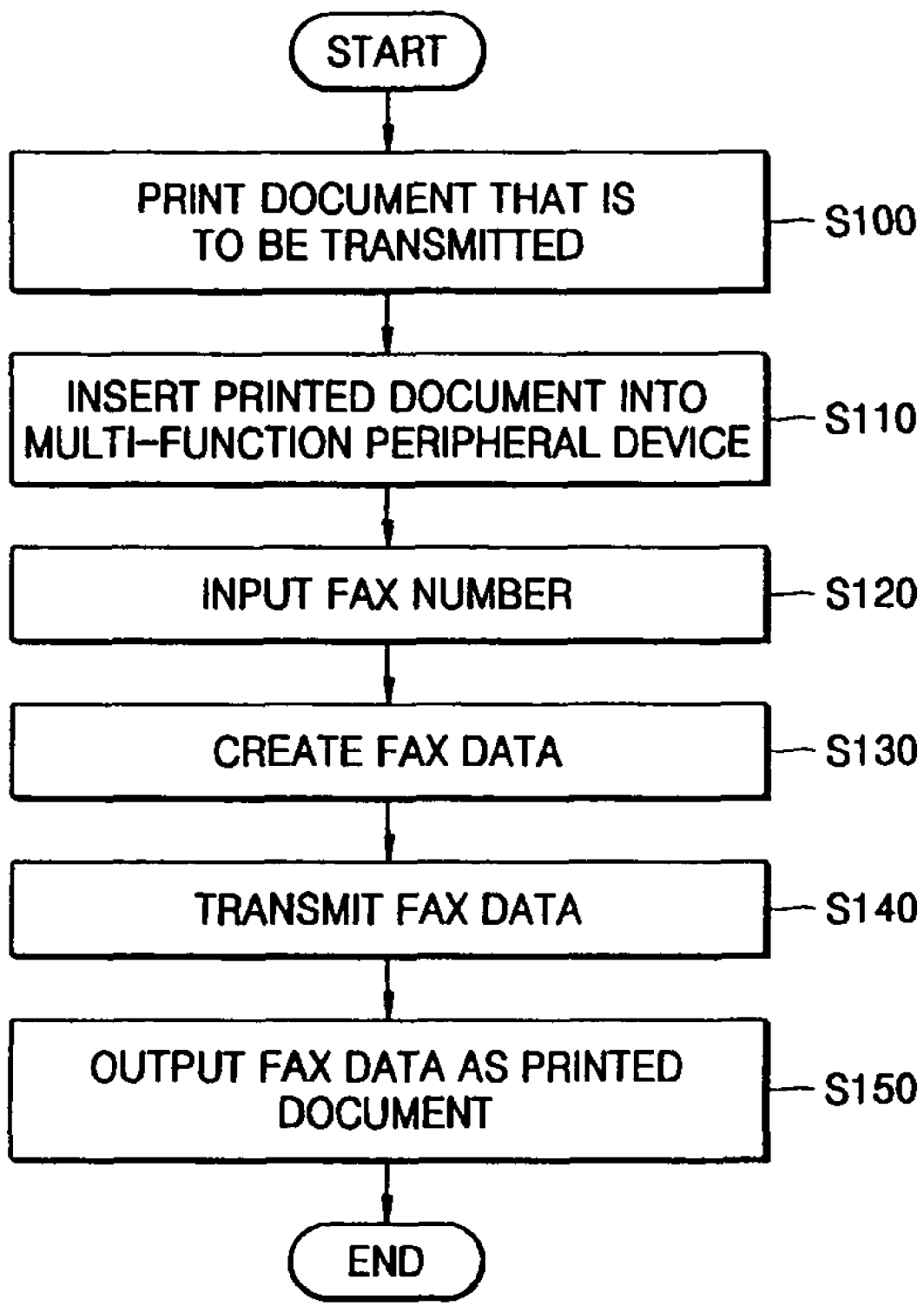
FIG. 1 is a flow chart illustrating a conventional method of printing or faxing a document created as a file in a host computer that is not connected to a network via a multi-function peripheral (MFP) device.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
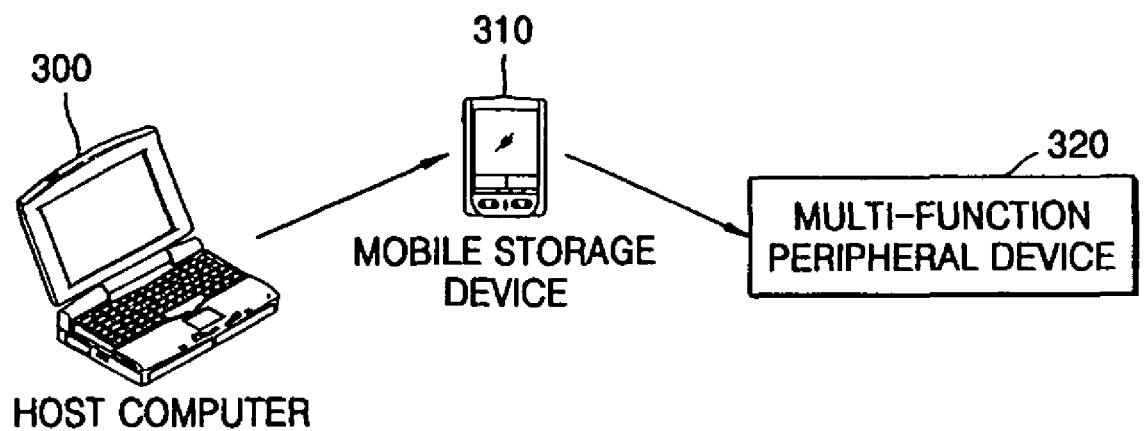
FIG. 2 is a view of a document processing system according to an embodiment of the present general inventive concept.

FIG. 2 is a view of a document processing system according to an embodiment of the present general inventive concept. Referring to FIG. 2, the document processing system includes a host computer 300, a mobile storage device 310, and a multi-function peripheral (MFP) device 320.

The host computer 300 can generate a data file that supports metadata of a document that is to be processed, and imbeds the metadata in the data file. Next, the data file in which the metadata is imbedded in the host computer 300 is stored in the mobile storage device 310. Metadata is structural data used to represent data of a document. For example, metadata of a document can designate certain attributes related to the document, for example, a font type and color, a form of a paragraph, and a document title. The metadata may also include one or more other attributes related to the document, which may include pieces of information such as a fax number of a sender and/or a recipient, information of the sender and/or the recipient, a date when a document was created, and a printing setting. For example, the metadata may include at least a fax number of a recipient and/or a printing setting which may be accessible by a user to provide the user with a future reference regarding past history of the document thereby making management of the document more convenient.

When the mobile storage device 310 is connected to the MFP device 320, the MFP device 320 can read the data file from the mobile storage device 310, and can extract metadata from the read data file. The MFP device 320 can use the extracted metadata to process the data file.

Figure 3:
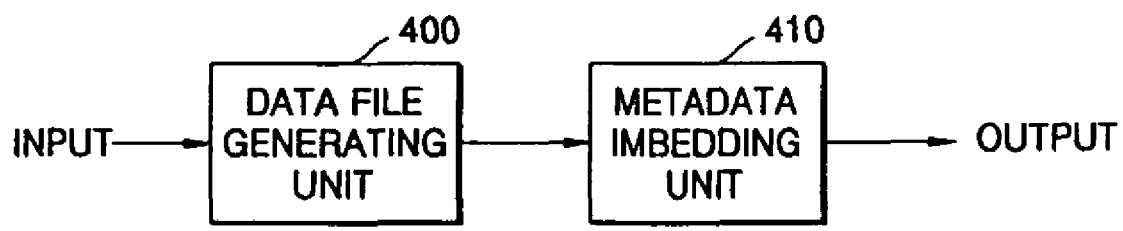
FIG. 3 is a block diagram of a host computer illustrated in FIG. 2 according to an embodiment of the present general inventive concept.

FIG. 3 is a block diagram of the host computer 300 illustrated in FIG. 2 according to an embodiment of the present general inventive concept. Referring to FIG. 3, the host computer 300 can include a data file generating unit 400 and a metadata imbedding unit 410.

The data file generating unit 400 can convert the document to be processed into a file format that supports the metadata and can generate a data file in which the metadata can be imbedded. The format of the data file may be, for example, *.tiff, *.jpeg, and *.doc.

When a user inputs information about a document, the metadata imbedding unit 410 can generate metadata corresponding to the user input information that has the same format as the data file and can imbed the generated metadata in the data file generated at the data file generating unit 400.

Figure 6:
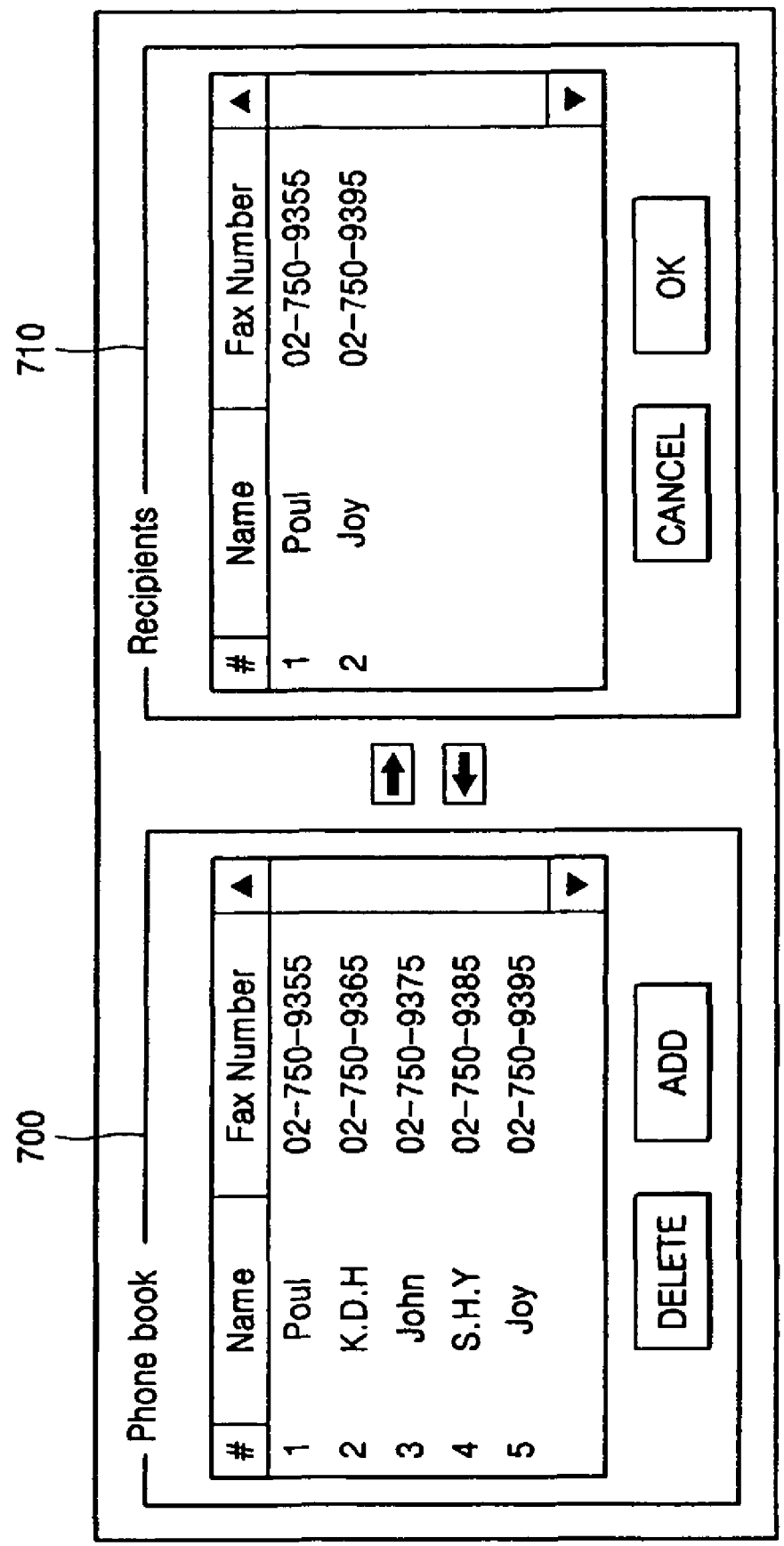
FIG. 6 illustrates a method of inputting a fax number in a host computer by a user according to an embodiment of the present general inventive concept.

For example, the metadata imbedding unit 410 generates metadata including a fax number of the receiving side of a fax transmittal and imbeds the metadata in the data file. FIG. 6 illustrates a method of inputting the fax number in the host computer 300 according to an embodiment of the present general inventive concept. Referring to FIG. 6, if a recipient is selected from a phone book 700, the name and the fax number of the recipient is displayed in a list of recipients 710. If the user presses an OK button, illustrated in FIG. 6, metadata of information including the selected fax number of the recipient is generated and imbedded in the data file.

Alternatively, in another example, the metadata imbedding unit 410 can generate metadata including printing settings, and the metadata can be imbedded in the data file.

Figure 4:
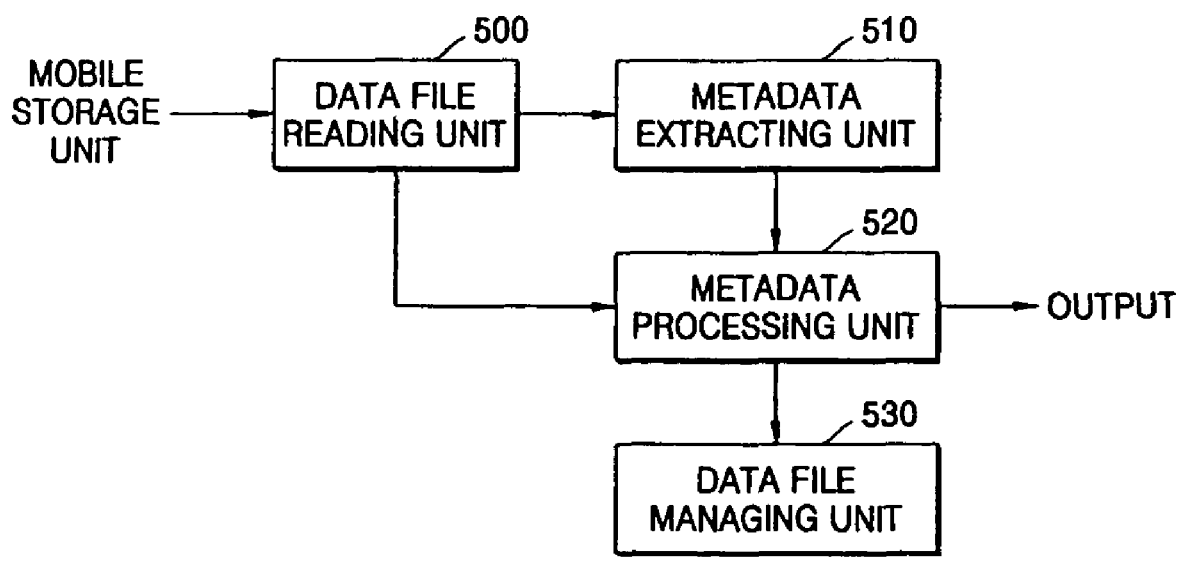
FIG. 4 is a block diagram of the MFP device as illustrated in FIG. 2 according to an embodiment of the present general inventive concept.

FIG. 4 is a block diagram of the MFP device 320 illustrated in FIG. 2, according to an embodiment of the present general inventive concept. Referring to FIG. 4, the MFP device 320 includes a data file reading unit 500, a metadata extracting unit 510, and a metadata processing unit 520. The MFP device 320 may further include a data file managing unit 530.

The data file reading unit 500 reads the data file stored in the mobile storage device 310.

The metadata extracting unit 510 extracts metadata from the data file read by the data file reading unit 500. The extracted metadata can include, for example, the fax number of the recipient and/or printing setting information of the document.

The metadata processing unit 520 can process the data file according to the metadata extracted by the metadata extracting unit 510. To do this, the MFP device 320 may include a firmware that can process the metadata.

As an example, when metadata including the fax number of the recipient is extracted by the metadata extracting unit 510, the metadata processing unit 520 sets the fax number of the recipient of the metadata and outputs the data file to a facsimile of the recipient (not shown) that corresponds to the set fax number. The data file managing unit 530 can generate metadata of information including the time the data file is faxed or the number of pages of the faxed document, and the metadata is imbedded in the data file. Therefore, the user can easily check the time the data file was faxed or the number of pages of the faxed document, thereby making management of the document convenient.

In another example, when metadata including information, such as, for example, printing settings of the document is extracted by the metadata extracting unit 510, the metadata processing unit 520 converts the metadata into a format that can be imbedded in a page description language (PDL) file format such as a postscript (PS) file format. Also, the metadata processing unit 520 converts the format of the data file into a PDL file that a print device can print, and the converted metadata is imbedded in the PDL file. Then, the metadata processing unit 520 prints the corresponding document of the PDL file in accordance with information on the printing settings of the converted metadata of the document. The data file managing unit 530 generates metadata regarding information on the printing time of the data file or the number of pages that are printed, and the metadata is imbedded in the data file. Therefore a user can find out the time the document was printed or the number of pages that was printed with ease.

Figure 5A:
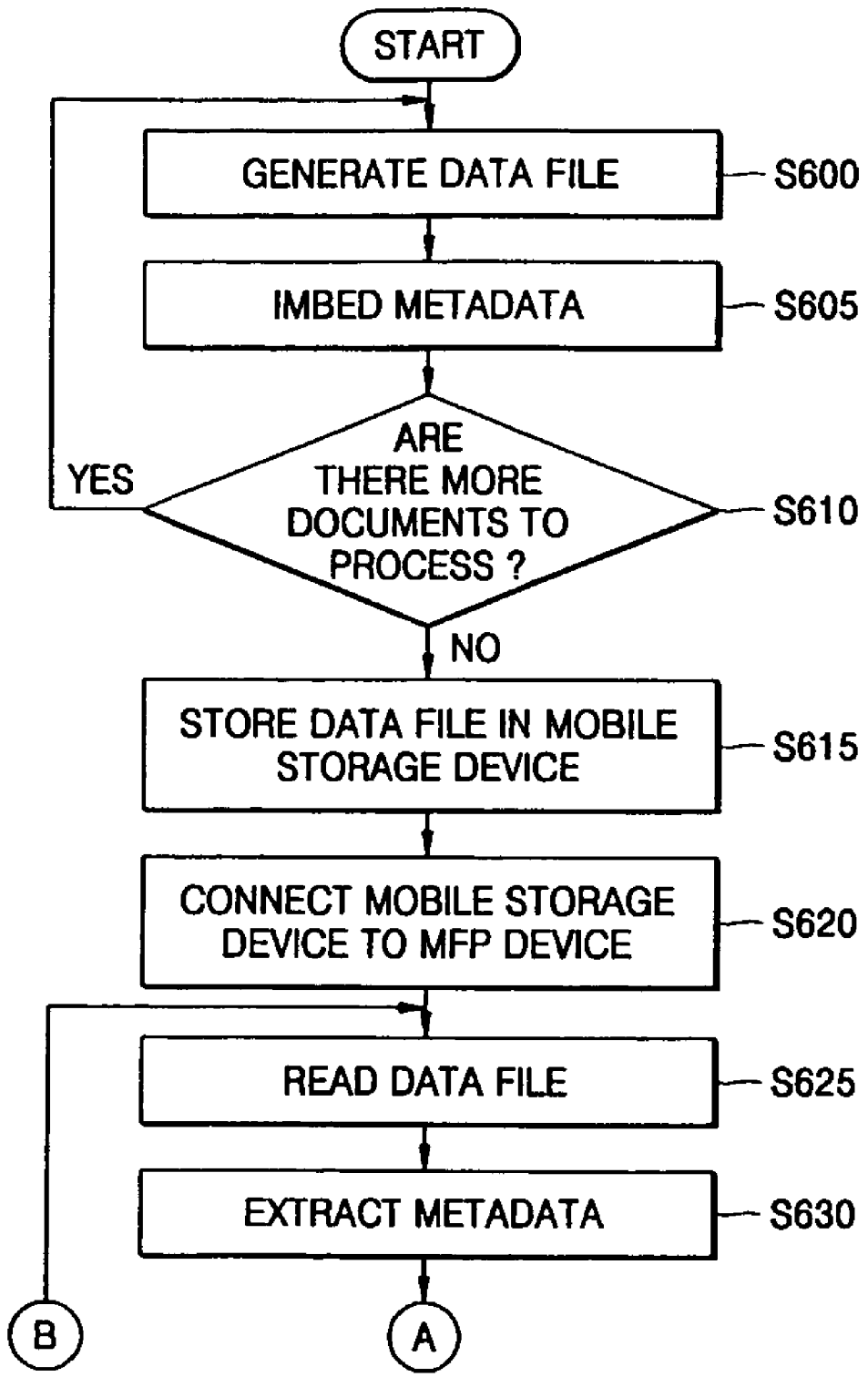
FIGS. 5A and 5B are flow charts illustrating a method of document processing according to an embodiment of the present general inventive concept.
Figure 5B:
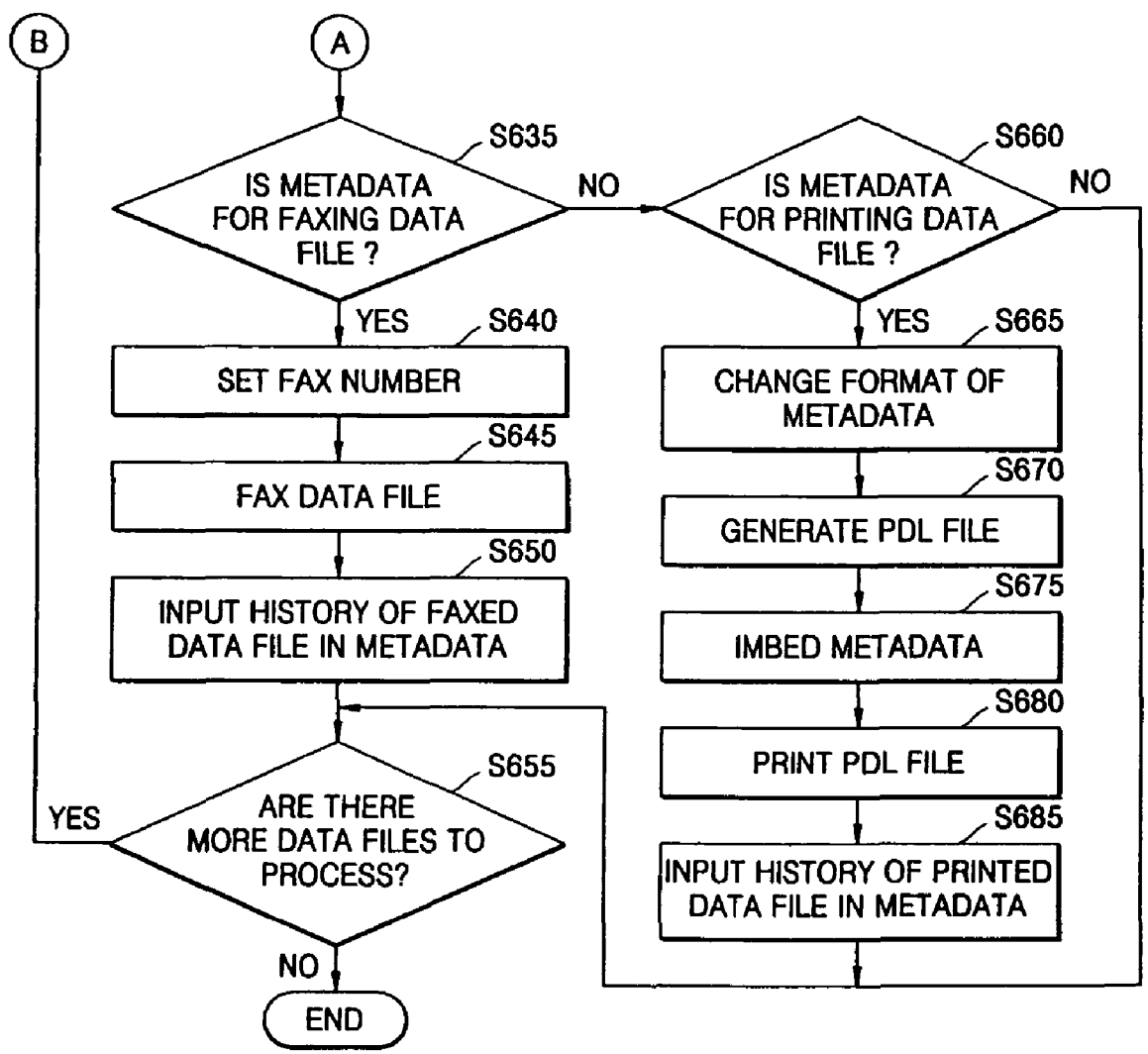

FIGS. 5A and 5B are flow charts illustrating a method of document processing according to an embodiment of the present general inventive concept. Thus, a method of document processing and operations of the devices illustrated in FIGS. 2 through 4 will be described with reference to FIGS. 5A and 5B.

A data file is created at the host computer 300 by converting a document that is to be processed into a format that supports metadata, such as *.tiff, *.jpeg, or *.doc, by the data file generating unit 400 (operation S600).

When information is input by a user or other input source regarding a document, the metadata imbedding unit 410 generates metadata of the input information and imbeds the metadata in the data file (operation S605).

A single data file in which metadata is imbedded is generated through operations S600 and S605. After operation S605, a check is performed at operation S610 to determine whether more documents need to be processed, and if more documents need to be processed, operations S600 and S605 are repeated.

When the data files of all the documents that are to be processed are generated, the data files are stored in the mobile storage device 310, such as a universal serial bus (USB) memory stick in operation S615.

When the mobile storage device 310 is connected to the MFP device 320, the data file reading unit 500 reads the data file having the imbedded metadata stored in the mobile storage device 310 at operation S625.

The metadata extracting unit 510 extracts the metadata from the data file read by the data file reading unit 500 at operation S630. As an example, metadata including a fax number of a recipient is extracted by the metadata extracting unit 510. As another example, metadata including printing settings of the document is extracted by the metadata extracting unit 510.

The metadata processing unit 520 processes the data file using the extracted metadata. A method of data file processing is described in detail below with reference to FIG. 5B, according to an embodiment of the present general inventive concept.

Referring to "A" of FIG. 5B, it is determined whether the extracted metadata is used to fax the data file at operation S635.

If the extracted metadata is used to fax the data file, the metadata processing unit 520 sets the fax number of the recipient included in the metadata at operation S640, and transmits the data file to the facsimile of the recipient that corresponds to the set fax number at operation S645. After transmitting the data file, the data file managing unit 530 can input information such as the time the document was faxed and/or the number of pages of the transmitted document in the metadata at operation S650.

Then, it is checked whether there are other data files that need to be processed at operation S655. If there are more data files to process, the process returns to operation S625, and if there are no more data files to process, the process is terminated.

If the extracted metadata is not used to transmit the fax in operation S635, it is determined whether the extracted metadata is used to print at operation S660.

If the extracted metadata is used to print, the metadata processing unit 520 converts the format of the extracted metadata into a format that can be imbedded in the PDL file such as the PS file format at operation S665. Also, the form of the data file is converted into the PDL file format at operation S670, and the converted metadata is imbedded in the PDL file at operation S675. The metadata processing unit 520 prints the data file in accordance with information on printing settings of the document included in the converted metadata at operation S680. If printing is completed, the data file managing unit 530 inputs history information of the printed data file, for example, information on the time the document was printed or the number of pages of the printed document is stored in the metadata at operation S685.

Then, the process is returned to operation S655, and is determined whether there are any more documents to process.

As described above, a system and method of document management using imbedded metadata can fax or print a document created on a host computer that is not connected to a network through a mobile storage device, even if a user does not input a fax number of a recipient or set printing settings when desiring to fax or print the document using a MFP device. In addition, management of the documents can be optimized since information processed by the MFP device is stored in the metadata.

As described above, a document processing system includes a host computer that generates a data file representing a corresponding document and metadata to designate attributes of the document, and imbeds the metadata in the data file, and a MFP device that receives the generated data file, extracts the metadata from the data file and processes the data file based on the metadata. The MFP device may receive the generated data file from a mobile storage device that communicates with the host computer. The host computer may convert the data file to a format that supports metadata of the document, for example, *.tiff, *.jpeg, and *.doc. The attributes of the document may include one or more of a font type, a color, a paragraph form, a title of the document, a fax number, a date, and a printing setting. The host computer may also include a metadata imbedding unit that generates additional metadata corresponding to user input data regarding the document and imbeds the additional metadata in the data file, where the additional metadata may be a fax number of an intended recipient of the document and a printing setting of the document. The MFP device may convert the metadata into a PDL format. The PDL device may further include a data file management unit that generates additional metadata to designate additional attributes of the document, for example, a printing time of the document, a number of pages of the document as printed, a time the document is faxed and a number of pages of the document transmitted during the fax. The additional attributes may be accessible to a user.

As described above, a method of document processing includes generating a data file representing a corresponding document and metadata to designate attributes of the document, imbedding the metadata in the data file, transferring the data file to a remote device, extracting the metadata from the data file, and processing the data file based on the metadata at the remote device.

As described above, a document processing system includes an MFP device that processes a data file having metadata embedded therein, and where the MFP includes a data file reading unit that reads the data file contents, a metadata extracting unit that extracts the metadata from the read data file, a metadata processing unit that processes the data file based on the metadata and performs at least one of a printing operation and a fax operation based on the metadata. The extracted metadata may include at least one of a fax number of an intended recipient of the document and a printing setting of the document.

As described above, a method of document processing includes reading the data file contents, extracting the metadata from the read data file, processing the data file based on the metadata, and performing at least one of a printing operation and a fax operation based on the metadata.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of document processing using a multi-function peripheral (MFP) device, the method comprising:
generating in a host computer a data file that supports metadata of a document, and imbedding a predetermined metadata in the data file using the host computer;
storing the data file in a mobile storage device separate from the host computer; reading the data file from the mobile storage device and extracting the metadata imbedded in the data file at the MFP device when the mobile storage device connects to the MFP device; and
processing in the MFP device the data file based on the extracted metadata; and
inputting information including a time the data file is processed or a number of pages of the document into the metadata after processing the data file in the MFP device,
wherein the inputting information is performed by the MFP device.

2. The method of claim 1, wherein the metadata comprises at least a fax number of a recipient.

3. The method of claim 2, wherein the processing of the data file comprises:
transmitting the data file through a network to the corresponding fax number of the recipient.

4. The method of claim 3, further comprising:
inputting information including a time the data file is transmitted or a number of pages of the data file transmitted of the corresponding document in the metadata.

5. The method of claim 1, wherein the metadata comprises:
at least information on a printing setting of the document.

6. The method of claim 5, wherein the processing of the data file comprises:
printing the data file according to the information on the printing setting of the document.

7. The method of claim 6, wherein the printing of the data file further comprises:
converting a format of the extracted metadata into a page description language (PDL) format;
changing the data file into a PDL file;
imbedding the converted metadata in the PDL file; and
printing the PDL file based on the imbedded metadata.

8. The method of claim 6, further comprising:
inputting information including a time the data file is printed or a number of pages of the document as printed in the metadata.

9. The method of claim 7, further comprising:
inputting information including a time the data file is printed or a number of pages of the document as printed in the metadata.

10. A document processing system which processes a document using a MFP device, the system comprising:
a host computer which generates a data file that supports metadata of the document and imbeds the metadata in the data file;
a mobile storage device which stores the data file, the mobile storage device being separate from the host computer; and
a MFP device which reads the data file from the mobile storage device, extracts the metadata imbedded in the data file, an-et processes the data file based on the extracted metadata when the mobile storage device connects to the MFP device, and inputs information on a time the data file is processed or a number of pages of the document in the metadata after the data file is processed in the MFP device.

11. The system of claim 10, wherein the host computer comprises:
a data file generating unit which generates the data file that supports the metadata of the document; and
a metadata imbedding unit which imbeds the metadata in the data file.

12. The system of claim 10, wherein the MFP device comprises:
a data file reading unit which reads the data file from the mobile storage device;
a metadata extracting unit which extracts the metadata imbedded in the data file; and
a metadata processing unit which processes the data file based on the extracted metadata.

13. The system of claim 11, wherein the metadata imbedding unit imbeds metadata including at least a fax number of a recipient in the data file.

14. The system of claim 12, wherein the metadata processing unit transmits the data file to the recipient of the fax number through a network.

15. The system of claim 14, further comprising:
a data file managing unit which inputs information on a time the data file is transmitted or a number of pages of the document in the metadata.

16. The system of claim 11, wherein the metadata imbedding unit imbeds the metadata including at least information on a printing setting of the document in the data file.

17. The system of claim 12, wherein the metadata processing unit converts a format of the extracted metadata into a PDL file format, changes the data file into a PDL file, imbeds the converted metadata in the PDL file, and prints the PDL file based on the information on a printing setting of the document.

18. The system of claim 17, further comprising:
a data file managing unit which inputs information on a time the data file is printed or a number of pages of the document as printed in the metadata.

* * * * *